United States Patent
Shallvari et al.

(10) Patent No.: US 9,090,243 B2
(45) Date of Patent: Jul. 28, 2015

(54) HYBRID VEHICLE CONTROL

(75) Inventors: Iva Shallvari, Troy, MI (US); Sashidhar Velnati, Oxford, MI (US); Kenneth P. DeGroot, Macomb Township, MI (US)

(73) Assignee: FCA US LLC, Auburn Hills, MI (US)

( * ) Notice: Subject to any disclaimer, the term of this patent is extended or adjusted under 35 U.S.C. 154(b) by 109 days.

(21) Appl. No.: 13/523,964

(22) Filed: Jun. 15, 2012

(65) Prior Publication Data

US 2013/0338864 A1 Dec. 19, 2013

(51) Int. Cl.
*B60L 9/10* (2006.01)
*B60L 11/00* (2006.01)
*G05D 1/00* (2006.01)
*G05D 3/00* (2006.01)
*G06F 7/00* (2006.01)
*G06F 17/00* (2006.01)
*B60W 10/06* (2006.01)
*B60W 10/08* (2006.01)
(Continued)

(52) U.S. Cl.
CPC ............... *B60W 10/06* (2013.01); *B60W 10/08* (2013.01); *B60W 20/1082* (2013.01); *F02D 41/024* (2013.01); *B60K 6/20* (2013.01); *B60W 2510/244* (2013.01); *B60W 2710/0627* (2013.01); *B60W 2710/0694* (2013.01); *F02D 2041/026* (2013.01); *Y02T 10/26* (2013.01); *Y02T 10/54* (2013.01); *Y02T 10/6269* (2013.01); *Y02T 10/6286* (2013.01)

(58) Field of Classification Search
CPC .......... B60W 2410/244; B60W 10/26; B60W 10/04; B60W 20/20; B60W 20/102; F01N 2240/36; F01N 13/02; F01N 11/02; F01N 13/09

USPC .............. 701/22, 102, 110, 105, 112; 60/285, 60/277; 180/65.28, 65.265, 65.25
See application file for complete search history.

(56) References Cited

U.S. PATENT DOCUMENTS

2003/0117113 A1* 6/2003 Takemasa et al. ............ 320/150
2006/0169245 A1* 8/2006 Zillmer et al. ................ 123/299
(Continued)

FOREIGN PATENT DOCUMENTS

DE        4400260 A1    7/1995
DE       19925100 A1   12/2000
(Continued)

OTHER PUBLICATIONS

International Search Report and Written Opinion dated Oct. 16, 2013 for International Application No. PCT/US2013/047590, International Filing Date Jun. 25, 3013.

*Primary Examiner* — Calvin Cheung
*Assistant Examiner* — Luis A Martinez Borrero
(74) *Attorney, Agent, or Firm* — Ralph E Smith

(57) ABSTRACT

A method and apparatus for heating a catalytic converter's catalyst to an efficient operating temperature in a hybrid electric vehicle when the vehicle is in a charge limited mode such as e.g., the charge depleting mode or when the vehicle's high voltage battery is otherwise charge limited. The method and apparatus determine whether a high voltage battery of the vehicle is incapable of accepting a first amount of charge associated with a first procedure to warm-up the catalyst. If it is determined that the high voltage battery is incapable of accepting the first amount of charge, a second procedure with an acceptable amount of charge is performed to warm-up the catalyst.

16 Claims, 2 Drawing Sheets

(51) Int. Cl.
*B60W 20/00* (2006.01)
*F02D 41/02* (2006.01)
*B60K 6/20* (2007.10)

(56) References Cited

U.S. PATENT DOCUMENTS

| | | | |
|---|---|---|---|
| 2006/0199695 A1* | 9/2006 | Miller et al. | 477/2 |
| 2006/0218894 A1* | 10/2006 | Miwa et al. | 60/277 |
| 2007/0113542 A1* | 5/2007 | Lewis | 60/285 |
| 2007/0272457 A1* | 11/2007 | Kodama et al. | 180/65.3 |
| 2010/0036589 A1* | 2/2010 | Ando | 701/105 |
| 2010/0044131 A1* | 2/2010 | Teraya | 180/65.265 |
| 2010/0152938 A1* | 6/2010 | Aoki et al. | 701/22 |
| 2010/0185349 A1* | 7/2010 | Harada et al. | 701/22 |
| 2010/0280737 A1* | 11/2010 | Ewert et al. | 701/102 |
| 2011/0035136 A1* | 2/2011 | Niimi | 701/110 |
| 2011/0202220 A1* | 8/2011 | Seta et al. | 701/22 |
| 2011/0213524 A1* | 9/2011 | Matsumoto | 701/22 |
| 2012/0072062 A1* | 3/2012 | Ando | 701/22 |
| 2012/0072063 A1* | 3/2012 | Kato et al. | 701/22 |
| 2012/0130577 A1* | 5/2012 | Ichimoto | 701/22 |

FOREIGN PATENT DOCUMENTS

| | | |
|---|---|---|
| DE | 102009027641 A1 | 1/2011 |
| EP | 1035304 A1 | 9/2000 |
| GB | 2326857 A | 1/1999 |

* cited by examiner

HYBRID VEHICLE CONTROL

GOVERNMENT INTEREST

This invention was made, at least in part, under U.S. Government, Department of Energy, Contract No. DE-EE0002720. The Government may have rights in this invention.

FIELD

The present disclosure relates to a control method for a hybrid electric vehicle, and more particularly, to a method of performing a catalyst light-off procedure in a hybrid electric vehicle based on heat requirements and limited excess engine output power.

BACKGROUND

Hybrid vehicles have been developed and continue to be developed to improve vehicle fuel economy and reduce vehicle emissions. Conventional hybrid electric vehicles (HEVs) combine internal combustion engines with electric propulsion systems. Plugin hybrid electric vehicles (PHEVs) share the characteristics of both conventional hybrid electric vehicles and all-electric vehicles by using rechargeable batteries that can be restored to full charge by connecting (e.g., via a plug) to an external electric power source.

PHEVs usually operate in charge depleting or charge sustaining modes. The high voltage battery of the PHEV can be fully charged or "charge limited" (i.e., incapable of further charging). As is known in the art, the charge depleting mode typically allows a fully charged PHEV to operate exclusively (with some exceptions) on electric power until its battery state of charge (SOC) depletes below a predetermined level, at which time the vehicle's internal combustion engine is turned on. As is also known in the art, charge sustaining mode uses both of the vehicle's power sources to operate the vehicle as efficiently as possible and without allowing the high voltage battery state of charge to move outside a predetermined band.

Today, most vehicle internal combustion engines are connected to a catalytic converter, which converts the engines' toxic exhaust emissions into non-toxic substances such as carbon dioxide, nitrogen and water. These converters are known to be highly efficient once their catalyst is heated to a "light-off" temperature of e.g., several hundred degrees Fahrenheit.

Often times it is desirable for a vehicle to undergo a special "light-off" process to ensure that the catalyst is heated to its "light-off" temperature as quickly as possible. A cooled-off catalyst will be ineffective and inefficient for converting the engine's toxic exhaust emissions into non-toxic substances when the engine is on. This typically occurs when the vehicle is initially started, has a cold engine and thus, a cold catalytic converter. The "light-off" process may operate the engine in a certain manner such that the temperature of the catalyst rises to its "light-off" temperature in the shortest amount of time. For hybrid electric vehicles, for example, the "light-off" process includes holding the vehicle's engine at a constant engine speed (Ni) and torque (Ti) and allowing the electric motors to compensate for the total output torque requested by the driver. This portion of the "light-off" process is sometimes referred to as an NiTi (engine speed, torque speed) process. In addition to the NiTi process, the engine's spark timing is slowed down (often referred to as spark retard), which sacrifices spark efficiency in favor of heating up the catalyst.

The above described "light-off" process works well when the HEV and PHEV are in the charge sustaining mode. In fact, while the engine's exhaust is raising the temperature of the catalyst, the engine's power can be used to charge the vehicle's high voltage battery. However, the current "light-off" process cannot be used when the HEV and PHEV's high voltage battery is charge limited (e.g., fully charged) such as when the vehicle is in charge depleting mode because the battery has limited (if any) capacity to accept more charge for safety and other reasons. Accordingly, there is a need for further improvement in the art.

SUMMARY

In one form, the present disclosure provides a method of controlling a hybrid electric vehicle to warm-up a catalyst within a catalytic converter of the vehicle. The method comprises determining whether a high voltage battery of the vehicle is incapable of accepting a first amount of charge associated with a first procedure to warm-up the catalyst, and if it is determined that the high voltage battery is incapable of accepting the first amount of charge, the method performs a second procedure with an acceptable amount of charge to warm-up the catalyst.

The present disclosure also provides a powertrain apparatus for a hybrid electric vehicle. The apparatus comprises an engine, a catalytic converter including a catalyst, said catalytic converter connected to an exhaust of the engine and a controller adapted to warm-up the catalyst by: determining whether a high voltage battery of the vehicle is incapable of accepting a first amount of charge associated with a first procedure to warm-up the catalyst; and if it is determined that the high voltage battery is incapable of accepting the first amount of charge, the controller performs a second procedure with an acceptable amount of charge to warm-up the catalyst.

In one embodiment, the second procedure comprises altering operation of a vehicle engine such that engine output power produces the acceptable amount of charge and operating the engine with the output power to warm-up the catalyst.

In one embodiment, altering the operation of the engine comprises raising an RPM set-point of the engine. In another embodiment, altering the operation of the engine comprises lowering a brake torque of the engine. In yet another embodiment, altering the operation of the engine comprises raising an RPM set-point and modifying an air flow rate of the engine.

In another embodiment, adjusting a spark timing of the engine is included as part of the first and second procedures.

Further areas of applicability of the present disclosure will become apparent from the detailed description, claims and drawings provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

According to the principles disclosed herein, and as discussed below, a new "light-off" process is used when the hybrid electric vehicle is in a charge limited mode such as e.g., the charge depleting mode (or when the vehicle's high voltage battery is otherwise charge limited). The new "light-off" process will shift the engine operation to deliver the optimal heat rate profile to the catalyst when the engine output power must be limited. The limit is a function of output power request, accessory power, system power losses and maximum battery charging power. The requirements for providing the heat rate profile are broken down into two components: exhaust gas flow rate passing through the catalyst and exhaust gas temperature. The exhaust gas temperature requirement will vary based upon system needs. A contemplated principle herein includes a method of heating a catalytic converter's catalyst to an efficient operating temperature when the hybrid electric vehicle is in a charge limited mode such as e.g., the charge depleting mode or when the vehicle's high voltage battery is otherwise charge limited.

Figure 1:
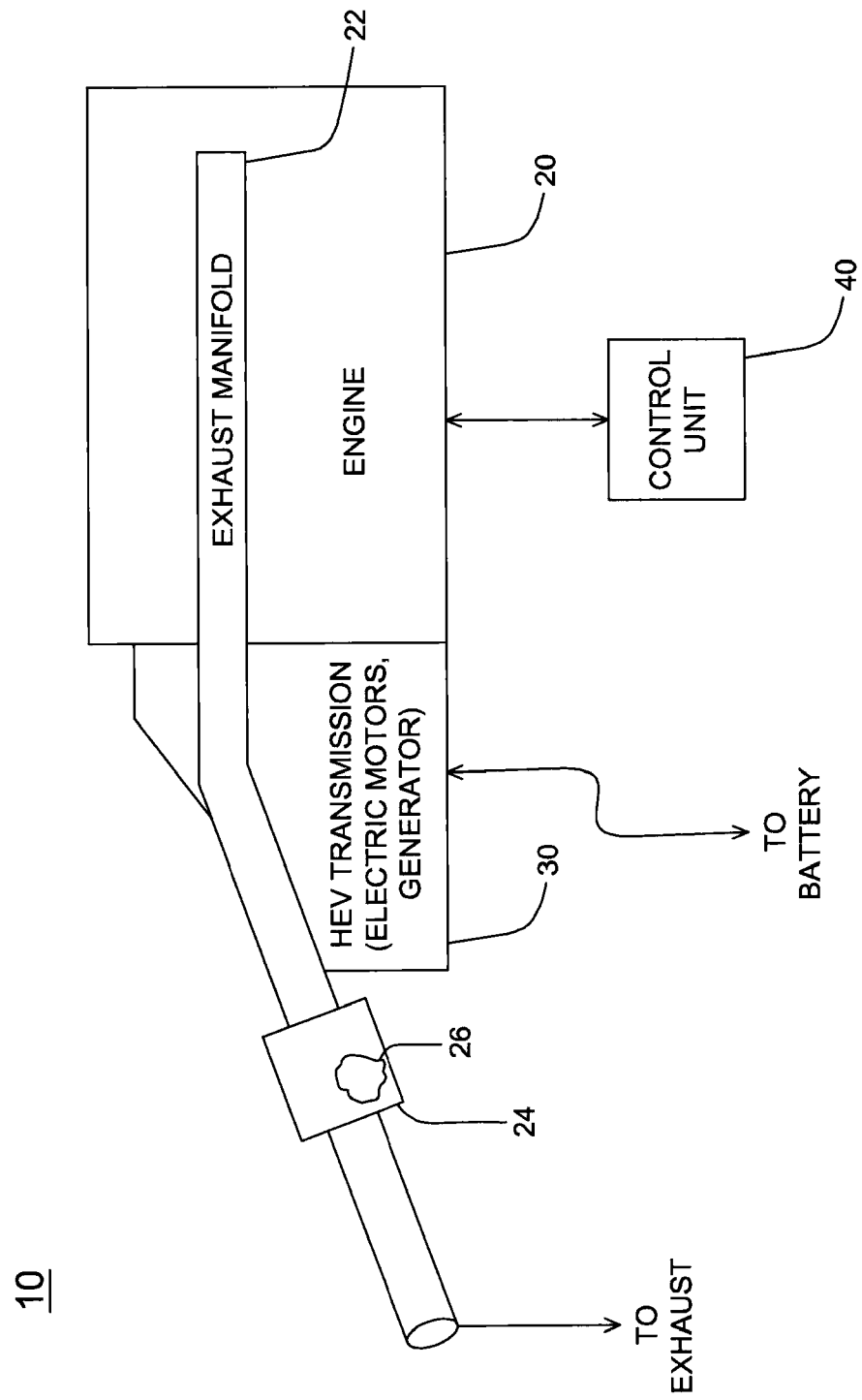
FIG. 1 illustrates a block diagram of a portion of a hybrid electric vehicle powertrain.

FIG. 1 illustrates a diagram of a portion of a hybrid electric vehicle powertrain 10. The hybrid electric vehicle can be e.g., a plug-in hybrid electric vehicle or other type of HEV. The illustrated powertrain 10 includes an internal combustion (IC) engine 20 and a hybrid electric vehicle transmission 30, which includes at electric motors and an electric generator. The hybrid electric vehicle transmission 30 is connected to a high voltage battery, which powers the generator and thus, the electric motors when the motors are in use. An exhaust manifold 22 is connected to the engine 20 and is used to expel exhaust gas from the engine 20 when the engine 20 is on. The exhaust gas is passed through a catalytic converter 24 that has a catalyst 26 for converting the engine's 20 toxic exhaust into non-toxic substances (e.g., carbon dioxide, nitrogen and water). Although not shown, the engine would also be connected to an air intake manifold, which allows air needed for fuel combustion to enter the engine 20.

A control unit 40 is operably connected to the engine 20 and the HEV transmission/electric generator 30 to control the various components of the powertrain 10, including start/stop functionality of the IC engine 20 and the placing of the vehicle in the desired operating mode. The control unit 40 may be a processor and may contain memory for storing computer instructions for carrying out the various functions performed by the control unit 40.

As noted above, and in accordance with the principles disclosed herein, the control unit 40 will be programmed to perform a method 100 (FIG. 2) for controlling the hybrid electric vehicle powertrain 10 in a manner that will heat the catalyst 26 to an efficient operating temperature even when the vehicle is in a charge limited mode (e.g., charge depleting mode).

Figure 2:
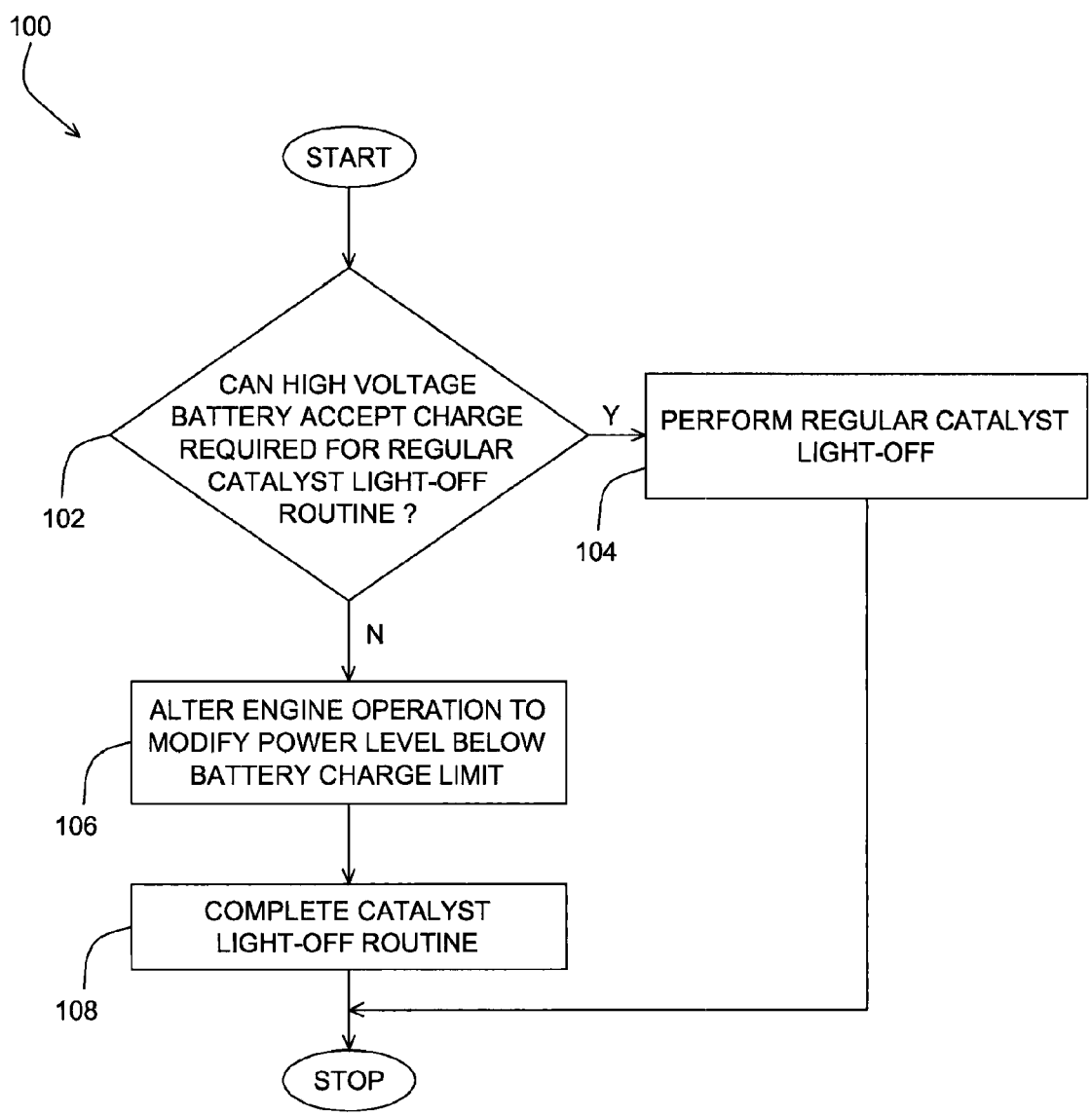
FIG. 2 illustrates a method of controlling the hybrid electric vehicle powertrain of FIG. 1 in accordance with principles disclosed herein.

FIG. 2 illustrates the method 100 executed by the control unit 40. In a desired embodiment, the method 100 is implemented in software, stored in a computer readable medium, which could be a random access memory (RAM) device, non-volatile random access memory (NVRAM) device, or a read-only memory (ROM) device) and executed by the control unit 40. In a desired embodiment, the method 100 is executed when it is determined that the temperature of the catalyst 26 needs to be raised.

The method 100 beings by determining if the vehicle's high voltage battery can accept the amount of charge to be generated by the regular "light-off" process (at step 102). That is, can the high voltage battery accept the charge generated by the engine when the NiTi (engine speed, torque speed) process (discussed above) is performed. In the desired embodiment, this step comprises determining the state of charge (SOC) of the high voltage battery and determining whether the current SOC indicates if the battery can accept the additional amount of charge that will be generated if the standard NiTi process is performed. It should be appreciated that the amount of charge attributable to the NiTi process can be determined based on several known factors including how much the temperature of the catalyst 26 needs to be raised and how long the engine will be operated at the rated speed and torque.

If it is determined that the vehicle's high voltage battery can accept the amount of charge to be generated by the regular "light-off" process (a "yes" at step 102), the regular "light-off" process comprising the NiTi and spark retard processes is performed at step 104. If, however, it is determined that the vehicle's high voltage battery cannot accept the amount of charge to be generated by the regular "light-off" process (a "no" at step 102), the regular "light-off" cannot be performed and the method 100 continues at step 106.

At step 106, the operation of the engine 20 is altered to modify its output power level to a level that can be accepted by the high voltage battery (i.e., the current SOC plus the determined power level will be below the battery's charge limit). As is discussed below, the engine 20 will be held at a higher engine speed and lower torque that satisfy the constrained high voltage charge limits of the charge limited battery and which get the temperature of the catalyst to an optimum level in the shortest amount of time to achieve the catalyst efficiency required to meet emission levels. This higher engine speed and lower torque are referred to herein as the "modified NiTi process."

Thus, at step 106, the method 100 raises the engine's 20 RPM set-point. The exhaust gas flow rate requirement, will dictate the mass of air entering the combustion chamber at the desired RPM set-point (i.e., a lower mass of air will be needed for the higher engine speed). Once the engine RPM and air flow rate have been defined, the indicated torque ($T_{Indicated}$) and the mechanical losses ($T_{Mechanical\text{-}Losses}$) (including e.g., pumping, frictional, and accessory losses, if applicable) will automatically be derived. The exhaust gas temperature can be achieved by the appropriate amount of ignition timing retard, at the RPM and air flow set-point, referred to as torque reserve ($T_{Reserve}$). Specific thresholds can be used for the amount of retard in ignition timing since the common concerns regarding excessive retard are not applicable in this scenario (i.e., if some engine instability would be caused by this retardation, the engine stability is guaranteed by the electric transmission and overheating the catalyst).

The final engine brake torque ($T_{Brake}$) is defined by the following equation:

$$T_{Brake} = T_{Indicated} - T_{Reserve} - T_{Mechanical\text{-}Losses} \quad (1)$$

The reduction of indicated torque ($T_{Indicated}$) will be comparable to the increase of RPM; however, the increase in mechanical losses ($T_{Mechanical\text{-}Losses}$) will serve as the primary leverage for a further decrease in brake torque ($T_{Brake}$). As a result, the engine 20 will output a lower brake power, while generating the desired catalyst heat profile. It is desirable to utilize this strategy for a short duration after the first engine start of a drive-cycle when catalyst efficiency takes priority over the fuel economy.

The method 100 operates the engine 20 using the modified NiTi described above until the catalyst temperature reaches or exceeds its "light-off" temperature (step 108). It should be appreciated that the use of spark retard to achieve a faster catalyst "light-off" (discussed above) will also be used.

It should be appreciated that the method 100 disclosed herein is particularly suitable for the strict super ultra low emission vehicle (SULEV) emissions standards that HEVs and PHEVs are required to meet. One portion of the SULEV emissions standards is known as the FTP (Federal Test Procedure) city test, which is a regulatory chassis dynamometer test that includes a cold crank with the vehicle soaking for at least 12 hours and an idle period (i.e., zero vehicle speed) of approximately 20 seconds. The disclosed method 100 allows the catalyst 26 to be warmed up, so that the vehicle's operation meets the emissions standards of the test, using the modified NiTi process, when the high voltage battery is charge limited, which is extremely beneficial and important in today's society.

What is claimed is:

1. A method of controlling a hybrid electric vehicle to warm-up a catalyst within a catalytic converter of the vehicle, said method comprising:

determining, by a controller, a state of charge of a high voltage battery of the hybrid electric vehicle;

determining, by the controller, whether the high voltage battery is capable of accepting a first amount of charge in addition to the determined state of charge, the first amount of charge associated with a first procedure to warm-up the catalyst to a light-off temperature, the first procedure including controlling an engine of the hybrid electric vehicle to operate at a first speed and a first torque;

performing the first procedure to warm-up the catalyst based on the controller having determined that the high voltage battery is capable of accepting the first amount of charge; and performing a second procedure associated with a second amount of charge to warm-up the catalyst to the light-off temperature based on the controller having determined that the high voltage battery is incapable of accepting the first amount of charge;

wherein the second amount of charge is in addition to the determined state of charge but less than a charge limit of the high voltage battery and the first amount of charge, and wherein the second procedure includes operating the engine at a second speed higher than the first speed and at a second torque lower than the first torque.

2. The method of claim 1, wherein the second procedure comprises:

altering operation of the engine, by the controller, such that engine output power produces the second amount of charge; and operating the engine with the engine output power to warm-up the catalyst.

3. The method of claim 2, wherein altering the operation of the engine comprises raising an RPM set-point of the engine to the second speed.

4. The method of claim 2, wherein altering the operation of the engine comprises lowering a brake torque of the engine.

5. The method of claim 4, wherein the brake torque is lowered in accordance with the formula $T_{Brake}=T_{Indicated}-T_{Reserve}-T_{Mechanical-Losses}$, where $T_{Brake}$ is the brake torque, $T_{Indicated}$ is an indicated torque, $T_{Reserve}$ is a torque reserve and $T_{mechanical-Losses}$ is torque associated with mechanical losses.

6. The method of claim 2, wherein altering the operation of the engine comprises raising an RPM set-point to the second speed and modifying an air flow rate of the engine.

7. The method of claim 1, further comprising the act of adjusting a spark timing of the engine as part of the second procedure.

8. The method of claim 1, further comprising the act of adjusting a spark timing of the engine as part of the first procedure.

9. A powertrain system for a hybrid electric vehicle, said system comprising:

an engine;

a catalytic converter including a catalyst, said catalytic converter connected to an exhaust of the engine; and a controller configured to warm-up the catalyst by:

determining a state of charge of a high voltage battery of the vehicle;

determining whether the high voltage battery of the vehicle is capable of accepting a first amount of charge in addition to the determined state of charge, the first amount of charge associated with a first procedure to warm-up the catalyst to a light-off temperature, the first procedure including controlling the engine to operate at a first speed and a first torque;

performing the first procedure to warm-up the catalyst based on the controller having determined that the high voltage battery is capable of accepting the first amount of charge; and performing a second procedure with a second amount of charge to warm-up the catalyst to the light-off temperature based on the controller having determined that the high voltage battery is incapable of accepting the first amount of charge;

wherein the second amount of charge is in addition to the determined state of charge but less than a charge limit of the high voltage battery and the first amount of charge, and wherein the second procedure includes operating the engine at a second speed higher than the first speed and at a second torque lower than the first torque.

10. The apparatus of claim 9, wherein the second procedure comprises:

altering operation of the engine such that engine output power produces the second amount of charge; and operating the engine with the engine output power to warm-up the catalyst.

11. The apparatus of claim 10, wherein altering the operation of the engine comprises raising an RPM set-point of the engine to the second speed.

12. The apparatus of claim 10, wherein altering the operation of the engine comprises lowering a brake torque of the engine.

13. The apparatus of claim 10, wherein the brake torque is lowered in accordance with the formula $T_{Brake}=T_{Indicated}-T_{Reserve}-T_{Mechanical-Losses}$, where $T_{Brake}$ is the brake torque, $T_{Indicated}$ is an indicated torque, $T_{Reserve}$ is a torque reserve and $T_{Mechanical-Losses}$ is torque associated with mechanical losses.

14. The apparatus of claim 10, wherein altering the operation of the engine comprises raising an RPM set-point to the second speed and modifying an air flow rate of the engine.

15. The apparatus of claim 9, wherein the controller adjusts a spark timing of the engine as part of the second procedure.

16. The apparatus of claim 9, wherein the controller adjusts a spark timing of the engine as part of the first procedure.

* * * * *